United States Patent Office 3,442,796
Patented May 6, 1969

3,442,796
CONTINUOUS LOW PRESSURE REFORMING PROCESS WITH A PREREDUCED AND PRE-SULFIDED CATALYST
John C. Hayes, Palatine, Ill., assignor to Universal Oil Products Company, Des Plaines, Ill., a corporation of Delaware
No Drawing. Continuation-in-part of application Ser. No. 570,693, Aug. 8, 1966. This application May 24, 1968, Ser. No. 731,694
Int. Cl. C10g 35/05; B01j 11/74
U.S. Cl. 208—139                        6 Claims

ABSTRACT OF THE DISCLOSURE

A charge stock boiling in the gasoline range is continuously reformed in a substantially water-free reforming zone by contacting the charge stock, hydrogen and sulfur or a sulfur-containing compound with a specially prepared reforming catalyst at reforming conditions, including a pressure of 50 to 350 p.s.i.g. The reforming catalyst utilized is prepared by the steps of: (a) contacting sulfur-free and water-free hydrogen with a sulfur-free composite of a platinum group component and a halogen component combined with an alumina carrier material at conditions selected to substantially reduce the platinum group component to the elemental state; (b) contacting the resultant reduced composite with a water-free mixture of hydrogen and hydrogen sulfide, containing 0.1 to 10 mole percent $H_2S$, at conditions including a temperature of 900–1100° F., sufficient to incorporate sulfur into the composite; and (c) thereafter maintaining the resultant reduced and sulfided composite in a substantially water-free environment. The principal benefit flowing from this preparation procedure involves the achievement and maintenance of the catalyst in a highly activated and stable state which is especially resistant to the severe stresses imposed by continuous low pressure reforming service in the presence of sulfur, thereby substantially improving the performance of such a process.

CROSS-REFERENCES TO RELATED APPLICATIONS

This application is a continuation-in-part of my application Ser. No. 570,693, filed Aug. 8, 1966 and of my application Ser. No. 560,903, filed June 27, 1966 and now both abandoned.

The subject of the present invention is an improvement in a low pressure reforming process which utilizes continuous controlled addition of sulfur to the reforming zone in conjunction with the substantial exclusion of water therefrom in order to obtain a catalyst life before regeneration which is comparable to the catalyst life observed at high pressure. More precisely, the present invention provides a catalytic composite which is unusually resistant to the severe deactivation-inducing conditions associated with low pressure reforming service in the presence of sulfur. In short, the present invention provides a method for prereducing and presulfiding a platinum metal-containing reforming catalyst in order to achieve and maintain the catalyst in a highly activated state which is especially resistant to the severe catalyst-deactivating conditions encountered in low pressure reforming.

The conception of this invention was facilitated by the recognition that sulfur and water, which are typically present during reforming catalyst manufacture procedures and which are usually thought of being relatively harmless, can combine through some esoteric mechanism to produce detrimental platinum metal crystallite growth such that efficient and effective utilization of platinum metal sites in the reforming catalyst is impaired. And in particular, the detrimental effects of this agglomeration reaction are particularly manifest in a high stress reforming process wherein low pressure is coupled with sulfur inclusion and water exclusion in order to enable the process to be run for a substantial catalyst life without regeneration. In other words, it has been determined that the performance of this high stress reforming process is particularly sensitive to the state of dispersion of the platinum metal crystallites in the catalyst; and, accordingly, his type of reforming process can be markedly improved by the achievement and maintenance of the platinum metal crystallites in a highly dispersed state. The present invention, therefore, provides a method for pretreating the catalyst which is to be utilized in this high stress reforming process in order to insure that the platinum metal crystallites are maintaned in a highly dispersed state. Moreover, I have determined that the essential requirements for the achievement and maintenance of this highly dispersed state consist essentially of a prereduction step followed by a presulfiding step, both of which are conducted so that sulfur and water are never simultaneously present in the catalyst environment.

Platinum metal-containing catalytic composites—especially platinum composited with alumina—are used to accelerate a wide spectrum of hydrocarbon conversion processes such as hydrogenation, dehydrogenation, isomerization, dehydrocyclization, ring isomerization, etc. Additionally, these catalysts have achieved a dominating position in reforming processes in which many of the aforementioned reactions simultaneously occur. In all of these processes, a central objective in recent years has been to make more efficient use of the platinum metal sites in the catalyst in order to decrease the concentration of platinum metal required to yield optimum results. One avenue of approach to this objective has been through attempts at achievement and maintenance of finely dispersed platinum metal crystallites in the catalyst so that there is a high concentration of available platinum sites per unit weight of the platinum metal. I have now discovered a pretreatment procedure which results in the consistent attainment and retention of finely dispersed, sulfided platinum metal crystallites of increased activity. The catalyst produced by this treatment procedure, has particular significance for a continuous reforming process operated under high stress conditions with the inclusion of sulfur and the exclusion of water to achieve high yields of a high octane reformate for extended periods of catalyst life before any regeneration is needed, because the performance of this process is particularly sensitive to the state of dispersion of the platinum metal crystallites. Accordingly, this process is markedly improved by the use of this pretreated catalyst.

It is well known in the art that the requirements for an optimum reforming process for transforming low octane stocks into high octane stocks, at minimum loss to undesirable products (i.e. $C_1$ to $C_4$) involves a specially tailored catalytic environment that is designed to promote upgrading reactions for paraffins and naphthenes, which are the components of gasolines and naphthas that have the highest octane-improved potential. For paraffins the upgrading reactions are: isomerization to more highly branched paraffins, dehydrogenation to olefins, dehydrocyclization to aromatics, and hydrocracking to lower molecular weight paraffins. Of these the dehydrocyclization reaction is the one that shows the maximum gain in octane number and is, consequently, preferred. For naphthenes, the principal upgrading reactions involve dehydrogenation and ring isomerization of naphthenes to aromatics; but, the change in octane number is not as dramatic here as in the case of dehydrocyclization of paraffins, since the clear research octane number of most naphthenes is in the range of 65 to 80. Accordingly, catalytic reforming operations are designed to provide an optimum mix between the aforementioned reactions, generally employing for this purpose a multi-purpose catalytic composite having at least a platinum metal dehydrogenation-hydrogenation component and an acid-acting component.

It is not, however, to be assumed that the achievement and control of this optimum mix of upgrading reactions is without its problem areas. These, as is true with any complex set of reaction mechanisms, are injected into the picture by the uncontrollable side phenomena that are produced by a myriad of factors that color and complicate the actual operations of a reforming process. Foremost among these complicating factors are those associated with undesired side reactions. Examples of these side reactions are: dimethylation of hydrocarbons to produce methane, ring-opening of naphthenes to give straight chain hydrocarbons, excessive hydrocracking to yield light gases, condensation of aromatics and other components to form carbonaceous deposits on the catalyst, acid-catalyzed polymerization of olefins and other highly reactive components to yield high molecular weight reactants that can undergo further dehydrogenation and contribute to the formation of carbonaceous deposits on the catalyst, etc.

Accordingly, a successful reforming operation minimizes the effects of these complicating factors by judicious selection of a catalytic composite, reaction environment, and process variables for the particular charge stock of interest. But, adding an additional dimension of complexity to the solution of these problems is the interdependence of the set of desired reactions and the set of undesired reactions such that selection of the proper conditions to minimize undesired reactions has a marked effect on the set of desired reactions. This situation is particularly acute for a continuous reforming system, that is, one operated without regeneration for a catalyst life of at least 15 barrels of charge per pound of catalyst (BPP), because in this system it is necessary to suppress undesired reactions in order to maintain catalyst activity at a high level for this catalyst life.

At this point, it is to be carefully noted that for some time now, there has been a substantial need for a continuous reforming process that can successfully operate at low pressure because the two main upgrading reactions mentioned previously—dehydrocyclization of paraffins and dehydrogenation of naphthenes—are net producers of hydrogen and as such are favored by low pressure. The expression "low pressure" as used herein means about 50 to 350 p.s.i.g.

The principal barrier to low pressure operation for a continuous reforming system in the past has been the effect of low pressure on the previously mentioned catalyst-fouling reactions of condensation and polymerization, which are believed to be the principal reactions involved in carbon or coke formation on the catalyst. It is thought that this carbon formation involves in part certain aromatic hydrocarbons which appear to be adsorbed on the surface of the reforming catalyst, particularly at the dehydrogenation and aromatization sites, and that these catalytically active sites are thereby shielded from the materials being processed. Moreover, aromatics and olefinic materials in the presence of a reforming catalyst tend to undergo dehydrogenation, condensation and polymerization type reactions and to settle on the catalyst and undergo further dehydrogenation until carbonaceous deposits are formed. Low pressures tend to favor these catalyst-fouling reactions because sufficient hydrogen is not available to suppress these catalyst-fouling reactions. In addition, a low partial pressure of hydrogen, since it suppresses hydrocracking and hydrogenation, tends to allow the carbonaceous deposit precursors to collect on the catalyst, whereas ordinarily the high cracking activity and hydrogenation activity of the catalyst would tend to keep the catalyst relatively clean. In any event, this increase in fouling at low pressures results in a decline in catalyst aromatization activity; and, if a product of constant octane number is desired, it is necessary to compensate for this deactivation. Usually the most direct and inexpensive method for compensating, in a continuous reforming system, involves increasing the reaction temperature. This in turn, however, leads to the promotion of hydrocracking to a greater extent than the dehydrogenation and dehydrocyclization reactions. Hence, greater losses to light gases are encountered and hydrogen consumption goes up and $C_5+$ yield goes down. Furthermore, the rate of catalyst fouling increases dramatically as temperature is increased. Accordingly, prior attempts at operating a continuous reforming process at low pressure have been unsuccessful because of this severe process instability.

I have previously found that by judicious selection of the catalyst environment the reactions associated with reforming catalyst-fouling at low pressure can be inhibited and catalyst stability sharply increased. Essential conditions for achievement of this end are the continuous introduction of sulfur to the reforming zone containing the catalyst coupled with the substantial exclusion of water therefrom. Now I have additionally determined that a platinmum metal-containing catalyst can be pretreated in order to obtain a catalytic composite having highly dispersed and highly active platinum metal crystallites and this composite effects an additional improvement in low pressure reforming. The pretreatment involves a procedure to insure the formation of highly dispersed, sulfided platinum crystallites without inducing agglomeration reaction, which I have found to be a substantial hazard associated with the conventional sulfiding procedures.

It is, accordingly, an object of the present invention to provide an improvement in a continuous low pressure reforming process. Another object is to provide a method for preparing a platinum metal-containing catalyst which is unusually resistant to the catalyst-deactivating conditions associated with a low pressure continuous reforming process.

In a broad embodiment the present invention relates to an improvement in a process for reforming a hydrocarbon charge stock boiling in the gasoline range wherein the charge stock, hydrogen, and sulfur or a sulfur-containing compound are continuously contacted, in a substantially water-free reforming zone, with a reforming catalyst at reforming conditions including a pressure of about 50 to about 350 p.s.i.g., and wherein the sulfur or sulfur-containing compound is continuously introduced into the reforming zone in an amount, calculated as an elemental sulfur, equivalent to about 50 to about 3,000 wt. p.p.m. of the charge stock. The improvement comprises utilizing in this process a reforming catalyst repared by the steps of: (a) contacting sulfur-free and water-free hydrogen with a sulfur-free composite of a platinum group component and a halogen component combined with an alumina carrier material at conditions including a temperature of about 900° F. to about 1,100° F. sufficient to substantially reduce the platinum group component to the elemental state; (b) contacting the resultant reduced composite with a water-free mixture of hydrogen and hydrogen sulfide containing about 0.1 to about 10 mole percent hydrogen sulfide at conditions including a temperature of about 900° F. to about 1,100° F. sufficient to incorporate about 0.05 to about 0.5 wt. percent sulfur into said composite; and, (c) thereafter maintaining the resultant reduced and sulfided composite in a substantially water-free environment.

Specific objects and embodiments of the present invention relate to details about the pretreatment method, the types of catalyst treatable thereby, the conditions utilized in the low pressure reforming process, the types of charge stock that can be charged thereto, and mechanism of effecting the process, as will be hereinafter discussed.

It has been known for some time that it is desirable to sulfide a platinum metal-containing catalyst prior to use in order to avoid excessive hydrocracking and excessive coke lay down during use. But I have now found that the sulfiding treatment, since it involves exposure of the catalyst to one of the agglomeration causing elements, involves a substantial risk of not fully realizing the increased activity and stability of the sulfided platinum metal crystallites. Moreover, I have found that, once a sulfided highly dispersed platinum metal catalyst is attained, it is necessary to prevent subsequent agglomeration triggering conditions, in order to fully reap the benefits of my recent discovery that sulfur addition and water exclusion during processing enables the operation of a continuous reforming process at low pressure. Hence, I have found the condition necessary to achieve and maintain a highly active reforming catalyst, which when coupled with low pressure reforming results in a superior process to that attained with either provision alone. As mentioned hereinbefore, this essential condition is the exclusion of the simultaneous presence of sulfur and oxygen during the preparation and use of the catalyst.

Before considering in detail the various ramifications of the present invention, it is convenient to define several of the terms, phrases, and expressions used in the specification and in the appended claims. The phrase "gasoline fraction" is intended to refer to a portion of a petroleum crude oil, of a mixture of synthesized hydrocarbons, of a coal tar distillate, of a shale oil, etc., that boils anywhere within the gasoline temperature range of about 50° F. to about 400° F. and typically has a gravity on the API scale at 60° F. of 50 to 70. The expression "sulfur entering the reforming zone" is to be construed to mean the total quantity of equivalent sulfur entering the reforming zone as elemental sulfur or in sulfur-containing compounds. The amounts of sulfur given herein are calculated as weight parts of equivalent sulfur per million weight parts of the gasoline fraction charged to the reforming zone. The expression "substantially freef rom water" refers to the situation where the total water and water-producing substances entering the reforming zone from any source is less than 10 wt. p.p.m. based on the gasoline fraction calculated as equivalent weight of water. The term "activity" when it is applied to reforming operations refers to the ability of the process to produce, at a specified severity level, a $C_5+$ reformate product of the required quality as measured by octane number. The term "stability" when it is applied to the reforming process refers to the rate of change of the operating parameters associated with the process; for instance, a common measure of stability is the rate of change of reactor temperature that is required to maintain a given octane number in output product— the smaller slope implying the more stable process. The "liquid hourly space velocity" (LHSV) is defined to be the equivalent liquid volume of the charge stock flowing over the bed of catalyst per hour divided by the volume of the reforming zone containing catalyst.

The hydrocarbon charge stocks that can be reformed in accordance with the improved process of the present invention comprise gasoline fractions containing naphthenes and paraffins. The preferred charge stocks are those consisting essentially of naphthenes and paraffins although in some cases aromatics and/or olefins are also present. The preferred class includes straight run gasolines, natural gasolines, synthetic gasolines and the like. On the other hand, it is frequently advantageous to charge thermally or catalytically cracked gasolines or higher boiling fractions thereof to the reforming process of the present invention. Mixtures of straight run and cracked gasoline can also be used. The gasoline charge stock may be a full boiling range gasoline having an initial boiling point of from about 50° F. to about 150° F. and an end boiling point within the range of from about 325 to 425° F., or may be a selected fraction thereof which usually will be a higher boiling fraction commonly referred to as a heavy naphtha—for example, a naphtha boiling in the range of $C_7$ to $C_{11}$. It is also within the scope of the present invention to charge pure hydrocarbons or mixtures of hydrocarbons, usually paraffins or naphthenes, which boil in the gasoline boiling range and are to be converted to aromatics.

The charge stock for the improved process of the present invention must be carefully controlled in the areas of concentration of sulfur-containing compounds and of oxygen-containing compounds. In general, it is preferred that the concentration of both of these constituents be reduced to low levels by any suitable pretreating means such as mild hydrogenation treatment (called in the art "hydrorefining," "hydrodesulfurization," etc.) with a suitable supported catalyst such as a cobalt and/or molybdenum catalyst. This is not to be construed to exclude the possibility that the concentration of sulfur-containing compounds in the charge stock could be carefully adjusted in order to furnish the required amount of sulfur to the reforming zone; but this latter method is difficult to control and is, consequently, not preferred. In any event, it is necessary that the total concentration of water and of water-yielding substances in the charge stock be reduced to at least 10 p.p.m. calculated as equivalent water. These restrictions are doubly significant in one embodiment of the present invention, in which the hydrogen gas contained in the effluent from the reforming zone is separated therefrom, and at least a portion of the separated hydrogen gas is recycled to the reforming zone without further treatment, because the available water and hydrogen sulfide will also be recycled with this hydrogen-rich gas. Accordingly, the concentration of these constituents will tend to build up to an equilibrium level in this recycle stream and small amounts of these materials in the input stream may, if the process is not carefully controlled, build up to substantial undesired levels in the recycle stream.

Accordingly, it is preferred to first reduce the equivalent sulfur and water concentration of the charge stock to very low levels, such as 5 wt. p.p.m. or less respectively, and thereafter inject a controlled amount of sulfur or a sulfur-containing compound into the reforming zone in any suitable manner. Any reducible sulfur-containing compound, that does not contain oxygen, which is converted to hydrogen sulfide by reaction with hydrogen at the conditions in the reforming zone may be used. This class includes: aliphatic mercaptans such as ethylmercaptan, propyl mercaptans, tertiary butyl mercaptans, etc.; aromatic mercaptans such as thiophenol and derivatives; naphthenic mercaptans such as cyclohexyl mercaptan; aliphatic sulfides such as ethylsulfide; aromatic sulfides such as phenyl sulfide; aliphatic disulfides such as tertiary butyl disulfides; aromatic disulfides such as phenyl disulfide; dithioacids; thioaldehydes; thioketones, heterocyclic sulfur compounds such as the thiophenes and thiopanes; and the like compounds. In addition, free sulfur or hydrogen sulfide may be used if desired. Usually, a mercaptan such as tertiary butyl mercaptan or heptyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

The amount of sulfur entering the reforming zone at any given time is a function of residual sulfur in the charge stock, the amount of sulfur added to the charge stock, the amount of sulfur in the hydrogen stream, and the amount added directly to the zone. Regardless of the source of the sulfur entering the reforming zone, it is an essential feature of the present invention that the total from all sources must be continuously maintained in the range of about 50 p.p.m. to about 3,000 p.p.m. based on weight of charge stock entering the reforming zone, and preferably about 150 to 1,500 wt. p.p.m.

Turning to the reforming catalyst utilized in the improved process of the present invention, it comprises an alumina carrier material (or alumina support) having combined therewith a platinum group component, a sulfur component, and a halogen component. Considering first the alumina carrier material, it is preferred that it be a porous, adsorptive, high surface area support having a surface area of about 25 to 500 or more m.$^2$/gm. Suitable alumina materials are the crystalline aluminas known as gamma-, eta-, and theta-alumina, with gamma-alumina giving best results. In addition, in some embodiments the alumina carrier material may contain minor proportions of other well-known refractory inorganic oxides such as silica, zirconia, magnesia, etc. However, the preferred support is substantially pure gamma-alumina. In fact, an especially preferred carrier material has an apparent bulk density of about 0.30 to about 0.70 gm./cc. and has surface area characteristics such that the average pore diameter is about 20 to about 300 Angstroms, the pore volume is about 0.10 to about 1.0 ml./gm. and the surface area is about 100 to about 500 m.$^2$/gm. A preferred method for manufacturing this alumina carrier material is given in U.S. Patent No. 2,620,314.

Another constituent of the reforming catalyst is a halogen component. Although the precise form of the chemistry of the association of the halogen component with the alumina carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the alumina support in any suitable manner, either before, during, or after the addition of the other components. For example, the halogen may be added as an aqueous solution of an acid such as hydrogen fluoride, hydrogen chloride, hydrogen bromide, etc. In addition, the halogen or a portion thereof may be composited with the alumina during the impregnation of the latter with the platinum group component; for example, through the utilization of a mixture of chloroplatinic acid and hydrogen chloride. In another situation, the alumina hydrosol which is typically utilized to form the alumina carrier material may contribute at least a portion of the halogen component to the final composite. In any event, the halogen will be typically composited in such a manner as to result in a final composite containing about 0.1 to about 1.5 wt. percent, and preferably about 0.4 to about 1.0 wt. percent of halogen calculated on an elemental basis.

As indicated above, the reforming catalyst, also contains a platinum group component. Although the process of the present invention is specifically directed to the use of a catalytic composite containing platinum or a compound of platinum, it is intended to include other platinum group metals such as palladium, rhodium, ruthenium, etc. The platinum group metallic component, such as platinum may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.01 to about 3 wt. percent of the final catalyst calculated on an elemental basis. Excellent results are obtained when the catalyst contains about 0.1 to about 2.0 wt. percent of the platinum group metal.

The platinum group metallic component may be incorporated in the catalytic composite in any suitable manner such as coprecipitation or cogellation with the alumina support, ion-exchange with the alumina support and/or alumina hydrogel, or impregnation of the alumina support at any stage in its preparation either before, during, or after its calcination treatment. The preferred method of preparing the catalyst involves the utilization of water soluble compounds of the platinum group metals to impregnate the alumina support. Thus, the platinum group metal may be added to the aulmina support by commingling the latter with an aqueous solution of chloroplatinic acid.

Following the platinum and halogen impregnation, the impregnated alumina carrier material is typically dried and subjected to a conventional high temperature calcination or oxidation technique to obtain an oxidized composite of a halogen component and a platinum group component with an alumina carrier material. The only limitation imposed by the present invention on the method utilized to prepare the oxidized composite is that it is essential that all reagents used for its preparation be free of sulfur so that the resulting oxidized composite is sulfur-free.

The procedure outlined above is intended to be illustrative only of a preferred procedure of obtaining a catalytic composite which is to be subjected to the treatment process of the present invention. It does not constitute an essential feature of the present invention and it is important primarily because it illustrates a preferred procedure of the prior art for obtaining a sulfur-free, platinum metal-containing composite which is then subjected to the treatment procedure of the present invention.

The present invention is concerned most particularly with the treatment following the preparation of the above sulfur-free oxidized composite. This treatment procedure embraces two steps—a reduction step followed by a sulfiding step. The essential feature of the pretreatment procedure is the careful control of sulfur and water such that they are never simultaneously present in the environment of the catalyst.

The reduction step is effected by contacting the oxidized, sulfur-free catalyst composite, obtained preferably as outlined above, with a stream of hydrogen that is substantially free of water and sulfur. This hydrogen can be once-through pure hydrogen or it can be recycle hydrogen that has been suitably scrubbed down to low level of water by passing the effluent from the reduction zone over high surface area sodium, alumino-silicates, alumina, silica gel, ion-exchange resins, etc. The temperature employed in this step is within the range of about 900° F. to about 1,100° F. and preferably about 950° F. to about 1,050° F. This reduction can be conducted at any suitable pressure, but it is generally more convenient to perform it at atmospheric. The time of contact of the hydrogen with catalytic composite varies as a function of the concentration of oxygen combined with the platinum metal; but, in general, it is at least one hour and is sufficient to reduce the platinum group component to the elemental state.

Following the reduction step, the resultant reduced sulfur-free catalyst composite is subjected to a sulfiding step. This step involves contacting the reduced composite with a water-free mixture of hydrogen and hydrogen sulfide. It is possible to employ other water-free gases than hydrogen as the diluent for the hydrogen sulfide, such as nitrogen or other inert gases; but I find that best results are obtained when water-free hydrogen is used. In addition, it is conceivable that a reducible sulfur-containing compound could be utilized to furnish the necessary hydrogen sulfide; but, it is preferred to directly utilize hydrogen sulfide. In any event, the concentration of hydrogen sulfide in the diluent must be carefully controlled to insure the deposition of the requisite amount of sulfur and the uniform distribution of the sulfur throughout the catalyst bed. This concentration, accordingly, is in the range of about 0.1 to about 10 moles of hydrogen sulfide per 100 moles of hydrogen. In line with the previous discussion it is an essential feature of the present invention that the sulfiding gas be water-free.

The sulfiding step is preferably conducted at substantially the same temperature that the reduction operation is performed at—namely, about 900° F. to about 1,100° F. Likewise, any suitable pressure can be employed in the execution of this step; but, generally, atmospheric pressure is preferred. Additionally, the time of contact and the temperature of the sulfiding gas are adjusted in order to combine from about 0.05% to about 0.50% by weight of sulfur witth the reduced catalytic composite.

The reduction and sulfiding steps of the present invention can be performed with the catalyst disposed on a moving belt or in a fluidized bed; however, it is generally preferred that the catalyst be disposed as a fixed bed in a suitable vessel which may be a reaction vessel, but which, more commonly, is a separate treatment vessel.

Up to this point, the principal area of discussion has been the achievement of the desired highly dispersed sulfided platinum crystallites; but this is only half of the problem. The remainder is, in short, to maintain this dispersion and catalyst composition during subsequent use of the catalyst. This requires careful control of the environment to which the sulfided catalytic composite is exposed. This control takes the following form. At low temperatures (i.e. less than 200° F.) the sulfided composite can stand exposure to dry oxygen, but because of its adsorption characteristic contact with water must be avoided. Thus, during storage and shipment substantial contact with water should be avoided. At high temperatures, both water and oxygen must be excluded from the environment of the catalyst in order to prevent the agglomeration reaction and maintain the catalyst in a highly active state.

When the sulfided catalytic composite of the present invention is employed in a continuous reforming process the protection of the catalyst requires: the reforming plant must be dried down to low levels of water before the catalyst is introduced, the start-up of the plant must be conducted under dry conditions, and the sulfided catalytic composite must, during operation, be maintained in an essentially water-free environment.

As indicated hereinbefore, I have now found that when the catalyst prepared as outlined above is utilized in a continuous reforming process in conjunction with sulfur exclusion and water inclusion that the performance of the process at low pressure is materially improved. Accordingly, the present invention enables a continuous reforming process to operate without regeneration for a catalyst life of 15 to about 100 or more barrels of charge per pound of catalyst.

According to the present invention, the gasoline fraction, hydrogen, and sulfur or a sulfur-containing compound are contacted with the catalyst prepared as outlined above in a reforming zone. This contacting may be accomplished in a fixed bed system, a moving bed system, a fluidized system, or in a batch type operation; however, in view of the danger of the attrition losses of the valuable catalyst and of well-known operational advantages, it is preferred to use a fixed bed system. In this system, a hydrogen-rich gas and the charge stock are preheated, by any suitable heating means, to the desired reaction temperature and then are passed in admixture with sulfur or a sulfur-containing compound, into a reforming zone containing a fixed bed of the catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

It is an essential feature of the present invention that the reforming zone is maintained substantially water-free. To achieve this condition, it is necessary to control the water level present in the charge stock and the hydrogen stream which are being charged to the reforming zone. It is essential that the equivalent water entering the reforming zone from all sources be held to a level less than that equal to 10 wt. p.p.m. In general, this can be accomplished by drying the charge stock with any suitable drying means known to the art such as a conventional solid adsorbent having a high selectivity for water, for instance, silica gel, activated alumina, calcium or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to dry the hydrogen stream entering the hydrocarbon conversion zone down to a level of about 5 volume p.p.m. of water or less. This can be conveniently accomplished by contacting the hydrogen stream with any suitable adsorbent such as the ones mentioned above. The preferred drying means is calcium aluminosilicate molecular sieves having a pore size of about 5 Angstroms.

As indicated previously, a singular feature of the improved process of the present invention is the capability to operate in a stable fashion at low pressure. In the past it has been the practice to operate at high pressure primarily to provide sufficient hydrogen to saturate hydrocarbon fragments generated during the reforming process and to prevent excessive carbon deposition on the catalyst with the attendant decline in the catalyst's activity for the upgrading reactions of interest. I have now found that a stable operation is achieved using the catalyst and process of the present invention at pressures in the range of about 50 to about 350 p.s.i.g. and preferably about 75 to about 300 p.s.i.g. The exact selection of the operating pressure within these ranges is made primarily as a function of the characteristics of the particular charge stock and catalyst used in the process.

The temperature required in the reforming zone is generally lower than that required for a similar high pressure operation. This significant and desirable feature of the present invention is a consequence of the inherent selectivity of the low-pressure operation for the octane-upgrading reactions as previously explained. In the past, when high-octane was required, it was the practice to run at higher temperatures in order to produce more hydrocracking of paraffins and thus concentrate the available aromatics in the product stream. The present process requires a temperature in the range of about 800° F. to about 1,100° F. and preferably about 850° F. to about 1,050° F.

The improved process is operated at a liquid hourly space velocity in the range of about 0.5 to about 15.0 hr.$^{-1}$ and preferably in the range of about 1.0 to about 5.0 hr.$^{-1}$. Furthermore, the amount of hydrogen-rich gas charged along with the hydrocarbon stream is from about 0.5 to about 20 moles of hydrogen per mole of hydrocarbon, and preferably from about 4 to about 12 moles of hydrogen per mole hydrocarbon.

An extraordinary feature of the improved process of the present invention is the infrequency with which the catalyst must be regenerated. Previously, low pressure operations have required extensive regenerating facilities if the associated catalyst is to be used for an economic period of time. The process of the present invention, since it operates for at least a catalyst life of 15 b.p.p. and more typically, 25 b.p.p. to 100 b.p.p., without any regeneration can be built without extensive regenerating facilities, such as swing bed reactors, thereby effecting great savings in initial investment. For example, for a typical reforming catalyst having an apparent bulk density of about 32 lb./cu. ft., the improved process of the present invention would operate, for a minimum catalyst life of at least 15 b.p.p., which at a typical LHSV of 1 hr.$^{-1}$ corresponds to 3.7 months before any regeneration of the catalyst would be required; and depending on the charge stock and severity level utilized, it would more typically operate for a catalyst life of about 25 b.p.p. to about 100 b.p.p. which at a LHSV of 1 hr.$^{-1}$ corresponds to a catalyst life of about 6.15 months to about 24.6 months without any regeneration of the catalyst. An additional incentive for avoiding frequent regeneration is the substantial danger of injecting small amounts of water into the system from the regeneration operation via inefficient purging techniques once the oxidation step of the regeneration cycle is completed. As previously discussed, the presence of even small quantities of water in the system can jeopardize the stability of the process of the present invention; accordingly, stringent precautions must be taken to insure that the system is substantially free from water after the infrequent regeneration operations which are performed on the improved process of the present invention.

The following examples are given to illustrate further the process of the present invention, and to indicate the benefits to be afforded through the utilization thereof. It is understood that the examples are given for the sole purpose of illustration, and are not considered to limit unduly the scope of the appended claims.

EXAMPLE I

A catalyst is prepared utilizing $\frac{1}{16}$ inch alumina spheres, manufactured by the method delineated in U.S. Patent No. 2,620,314 issued to James Hoekstra. The spheres are then impregnated with a sufficent quantity of an aqueous solution of chlorplatinic acid and hydrogen chloride to yield a final composite containing 0.75% by weight of platinum, calculated on an elemental basis, and 0.90% by weight of combined chloride calculated on an elemental basis. The impregnated spheres are then dried at a temperature of about 300° F. and thereafter calcined, in an atmosphere of air, at a temperature of about 950° F. for about two hours. At this point the resultant catalytic composite contains less than 2% by weight of volatile matter.

A portion of the resultant oxidized catalytic composite is subjected to a pretreatment procedure which comprises contacting the composite with a mixture of hydrogen and hydrogen sulfide in which about 300 p.p.m. by volume of hydrogen sulfide are present. The contacting is performed at a temperature of about 950° F. and atmospheric pressure for a period of time (i.e. in this case about 2 hours) sufficient to substantially reduce the platinum component of the catalyst. An additional treatment of the reduced catalytic composite with hydrogen sulfide is then performed in such a manner as to result in a catalytic composite with a sulfur concentration of about 0.1% by weight of sulfur calculated on an elemental basis. This catalyst is emblematic of a catalyst that is manufactured according to that part of the prior art that teaches a combined sulfiding reduction step, or of a catalyst that is not sulfur-free at the beginning of the reduction step, or of a catalyst prepared with impure hydrogen, or of a catalyst sulfided in the presence of water, particularly, the water evolved during reduction. This catalyst is hereinafter designated as catalyst "A."

Another portion of the resultant oxidized catalytic composite is subjected to the treatment procedure of the present invention which comprises: contacting the oxidized catalytic composite with sulfur-free and water-free hydrogen at atmospheric pressure and at a temperature of about 950° F. for about 2 hours such that the platinum metal is reduced and formed into highly dispersed crystallities; and, thereafter, contacting the resultant reduced catalytic composite with a water-free mixture of hydrogen and hydrogen sulfide, in which the hydrogen sulfide is present in about 1.0% by volume, at atmospheric pressure and a temperature of about 950° F., for a period of time which results in the incorporation of about 0.1% by weight of sulfur calculated on an elemental basis. Hence, this catalyst is emblematic of the consistently high quality catalyst of the present invention and is designated as catalyst "B" in the subsequent discussion.

It is to be emphasized at this point that catalysts "A" and "B" have identical wt. percent compositions and differ only in their method of preparation.

Catalysts "A" and "B" are then separately used in a high stress reforming process. This encompasses charging a hydrorefined light naphtha having an initial boiling point of 255° F., and end boiling point of 380° F., a 59.3° API gravity at 60° F., a paraffin content of 81% by volume, a naphthene content of 16% by volume, an aromatic content of 3% by volume, and an equivalent water content of less than 2 wt. p.p.m. to a reforming plant containing the catalyst. In addition, tertiary butyl mercaptan is added to the charge stock to provide 600 p.p.m. of equivalent sulfur. The reforming plant is maintained substantially water-free during the run by the use of high surface area sodium dryers on both the hydrogen stream and the hydrocarbon stream being charged thereto.

The plant is operated at a pressure of 100 p.s.i.g., at a space velocity (LHSV) of 2.0 hr.$^{-1}$ and a hydrogen to charge stock mole ratio of 10.0:1. The plant temperature is adjusted during the run in order to make a $C_5+$ reformate having an octane number of 100 F-1 clear.

The run for catalyst "B" is operated for the same period of time as for catalyst "A." A comparison of the results of the run shows catalyst "A" consistently requires a higher temperature to make octane than that for catalyst "B". Furthermore, the average $C_5+$ yield based on vol. percent of charge for catalyst "A" is about 10% below that achieved with catalyst "B," and catalyst "A" deactivates at a rate which is about twice as great as for catalyst "B."

Hence, this example manifests the benefits associated with use of a prereduced and prtsulfided catalyst in a continuous reforming process where the catalyst is prepared and maintained in a highly active state. Additionally, catalyst "A" is removed from the reactor and subjected to an examination which indicates that platinum crystallite growth to 50–80 Angstrom units has occurred. The same examination shows a crystallite size for catalyst "B" of less than 30 Angstroms. Thus, these results evidence the adverse effects of the agglomeration reaction that has been triggered by the simultaneous presence of sulfur and water during catalyst preparation.

EXAMPLE II

This example illustrates the ability of a catalyst, prepared according to the present invention and maintained in highly dispersed and active state by the careful exclusion of water from the reforming zone and by the controlled addition of sulfur, to selectively reform a hydrocarbon charge stock at low pressure with exceptional process stability.

A desulfurized heavy Kuwait straight run naphtha having an initial boiling point of 175° F., an end boiling point of 343° F., a sulfur content of less than 1 p.p.m., a nitrogen content of less than 5 p.p.m., and a water content of 1 p.p.m., is charged to a reforming zone containing a catalyst comprising alumina, 0.75% by weight of platinum, 0.90% by weight of chloride, and 0.10% by weight of combined sulfide. The catalyst is manufactured according to the method delineated in Example I for catalyst "B."

The reforming process is maintained at a pressure of 150 p.s.i.g., an LHSV of 1.5, a ratio of moles of hydrogen to moles of hydrocarbon of 7.5, and the initial reactor temperature of 970° F.

The flow scheme is, essentially: passing the charge stock with a hydrogen-rich gas over the reforming catalyst into a high pressure separating zone, recycling a portion of the hydrogen-rich gas from the separating zone to the reforming zone, and debutanizing the liquid effluent from the separating zone to yield a high-octane product. Before the plant is started up, it is dried to 10 p.p.m. water in the recycle gas by circulating hydrogen through a molecular sieve drier at 400 p.s.i.g.

Tertiary butyl mercaptan is added to the feed to maintain the total hydrogen sulfide entering the reforming zone, from both the charge stock and the recycle hydrogen gas at 1,500 p.p.m. based on charge stock.

The reactor temperature is adjusted throughout the run in order to maintain the output debutanizer product stream at an octane number of 100 F-1 clear.

The process is run for an extended period of time at a deactivation rate measured by the rate of temperature increase necessary to maintain octane, which is approximately the same as that associated with the same charge stock and process operated at a pressure of 500 p.s.i.g. Accordingly, similar stability to that experienced at much higher pressures is observed with the improved process of the present invention; and, additionally, a gain in debutanized product yield of 7 to 10% over what would be recorded at 500 p.s.i.g., for the same octane number, is experienced.

I claim as my invention:

1. In a process for reforming a hydrocarbon charge stock boiling in the gasoline range wherein the charge stock, hydrogen, and sulfur or a sulfur-containing compound are continuously contacted, in a substantially water-free reforming zone, with a reforming catalyst at reforming conditions including a pressure of about 50 to about 350 p.s.i.g., and wherein the sulfur or sulfur-containing compound is continuously introduced into the reforming zone in an amount, calculated as an elemental sulfur, equivalent to about 50 to about 3,000 wt. p.p.m. of the charge stock, the improvement comprising utilizing a reforming catalyst prepared by the steps of:

(a) contacting sulfur-free and water-free hydrogen with a sulfur-free composite of a platinum group component and a halogen component combined with an alumina carrier material at conditions including a temperature of about 900° F. to about 1,100° F. sufficient to substantially reduce the platinum group component to the elemental state;

(b) contacting the resultant reduced composite with a water-free mixture of hydrogen and hydrogen sulfide containing about 0.1 to about 10 mole percent hydrogen sulfide at conditions including a temperature of about 900° F. to about 1,100° F. sufficient to incorporate about 0.05 to about 0.5 wt. percent sulfur into said composite; and (c) thereafter maintaining the resultant reduced and sulfided composite in a substantially water-free environment.

2. The improved process of claim 1 wherein said platinum group component is platinum or a compound of platinum.

3. The improved process of claim 2 wherein said platinum comprises about 0.01 to about 3.0 wt. percent of the catalyst, calculated on an elemental platinum basis.

4. The improved process of claim 1 wherein said halogen component is chlorine or fluorine.

5. The improved process of claim 1 wherein said alumina carrier material consists essentially of gamma-alumina.

6. The improved process of claim 4 wherein said halogen component comprises about 0.1 to about 1.5 wt. percent of the catalyst calculated on an elemental basis.

References Cited

UNITED STATES PATENTS

| | | | |
|---|---|---|---|
| 2,952,611 | 9/1960 | Haxton et al. | 208—65 |
| 3,296,119 | 1/1967 | Bicek | 208—139 |
| 3,330,761 | 7/1967 | Capsuto et al. | 208—139 |

HERBERT LEVINE, *Primary Examiner.*

U.S. Cl. X.R.

252—439